United States Patent [19]

Esposito et al.

[11] Patent Number: 5,398,805
[45] Date of Patent: Mar. 21, 1995

[54] WEAR SHOE RETAINER FOR A SLUDGE COLLECTOR FLIGHT

[75] Inventors: Frank A. Esposito, Little Neck; Ronald Wallace, Williston Park, both of N.Y.

[73] Assignee: Interfit International, Ltd., Lake Success, N.Y.

[21] Appl. No.: 166,506

[22] Filed: Dec. 13, 1993

[51] Int. Cl.⁶ .......................................... B65G 19/24
[52] U.S. Cl. ................................ 198/731; 198/734
[58] Field of Search .............. 198/721, 719, 731, 733, 198/734, 749

[56] References Cited

U.S. PATENT DOCUMENTS

| | | | |
|---|---|---|---|
| 2,571,724 | 10/1951 | Keeny | 198/719 X |
| 3,456,779 | 7/1969 | Andreae | 198/749 |
| 4,585,116 | 4/1986 | Albrecht | 198/734 X |
| 4,663,042 | 5/1987 | Rasper et al. | 198/731 X |
| 4,815,586 | 3/1989 | Heising | 198/734 X |
| 4,946,026 | 8/1990 | Rickman | 198/734 X |
| 5,056,651 | 10/1991 | Nagamatsu | 198/731 X |

Primary Examiner—D. Glenn Dayoan
Attorney, Agent, or Firm—Collard & Roe

[57] ABSTRACT

A wear shoe holder is provided for allowing the easy removal and replacement of wear shoes from sludge collector flights in a sludge collecting tank. The wear shoe holder is a retaining plate fastened to a sludge collecting flight. The inside surface of the retaining plate has detents that become axially aligned with the apertures in a wear shoe when the wear shoe is in its proper operating position. The detents hold the wear shoe securely in place during operation and allow for the easy replacement of a worn wear shoe.

16 Claims, 3 Drawing Sheets

WEAR SHOE RETAINER FOR A SLUDGE COLLECTOR FLIGHT

BACKGROUND OF THE INVENTION

1. Field of the Invention

The present invention relates to a wear shoe retainer for sludge collector flights. More particularly, it relates to a wear shoe retainer in which the wear shoes can be easily and quickly replaced without specialized tools.

2. The Prior Art

Sludge collection devices generally include flights, extending laterally across a sludge collection unit or cell forming a portion of a larger sludge tank having many such units disposed side by side in fluid communication. The flights of each unit are driven adjacent the bottom of each unit, to transport the settled sludge to one end of the unit for further treatment separate from the liquid.

The tanks in which these sludge collection devices are used are generally fabricated of concrete, and therefore, rails are disposed in the floor providing a slight elevated ridge above the floor on which the flight can ride. The flights have attached thereto replaceable wear shoes secured in alignment with the floor rails to accept the wear caused by the sliding engagement. As a result, the wear shoes must be periodically replaced. The fastening hardware that secures the wear shoe to the flight is frequently corroded from exposure to the waste water and must be cut off. Therefore, it would be desirable to provide a wear shoe retaining system in which the wear shoes could be quickly and easily replaced without requiring new fastening hardware.

SUMMARY OF THE INVENTION

Accordingly, it is an object of the present invention to provide a wear shoe retaining assembly for a sludge collector flight that allows wear shoes to be quickly and easily replaced.

It is yet another object of the invention to provide a wear shoe retaining assembly for a sludge collection flight that eliminates the need for fastening hardware.

It is yet a further object of the invention to provide a wear shoe retaining assembly that does not require specialized tools to replace the wear shoes.

It is another object of the invention to provide a flexible retaining plate that removably retains the wear shoe.

These and other related objects are achieved according to the invention by a wear shoe retainer assembly for a sludge collector flight having a wear shoe with an inner surface, an outer surface, an upper member and a lower member. The upper member is in perpendicular relation to the lower member and the upper member has two apertures therethrough. The assembly consists of retaining means for flexibly and releasably holding the wear shoe adjacent the sludge collector flight. The retaining means includes a plate fastened to the sludge collector flight. The retaining plate has an inside surface, an outside surface and detents formed on the inside surface for engaging the wear shoe.

The inside surface of the retaining plate is spaced from the sludge collector flight to form an opening for receiving the wear shoe and securing it to the sludge collector flight. The wear shoe is movable between an attached position where the detents are axially aligned with the apertures in the wear shoe and an unattached position. The inside surface of the retaining plate abuts the outer surface of the wear shoe in the attached position. The wear shoe is made of plastic and the retaining plate is made of stainless steel. The detents are sloped toward the sludge collector flight for facilitating the insertion and removal of the wear shoe from the retainer.

Alternatively, the device includes a retaining plate, having two flanges securely attached to the sludge collector flight. The retaining plate has a central section spaced from the sludge collector flight adapted to readily receive and retain the wear shoe in an operative position. The central section of the retaining plate is U-shaped and has two legs, each with a free end. The free ends are disposed adjacent the sludge collector flight and each of the free ends are integrally connected to the two flanges. The U-shaped central section has a base portion connected between the two legs. The base portion includes detents extending toward the sludge collector flight for engaging the wear shoe. The detents are tapered in the direction of the sludge collector flight.

In a further embodiment, the device consists of a sludge collector flight having a leading surface facing a direction of travel and a U-shaped retaining plate. The U-shaped retaining plate includes a base disposed generally parallel to the sludge collector flight and spaced from the sludge collector flight to form a wear shoe receiving slot. The plate further includes two legs extending between the base and sludge collector flight defining spaced opposite ends of the slot, each of said legs has a free end. The plate further includes means for engaging the wear shoe and resiliently retaining the wear shoe adjacent the leading surface of the sludge collector flight. A flange is integrally formed with each of the free ends. The flanges are securely fastened to the leading surface of the sludge collector flight. The retaining plate is adapted for flexing outwardly away from the sludge collector flight to facilitate releasable coupling of the wear shoe with the wear shoe receiving slot and engaging means.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
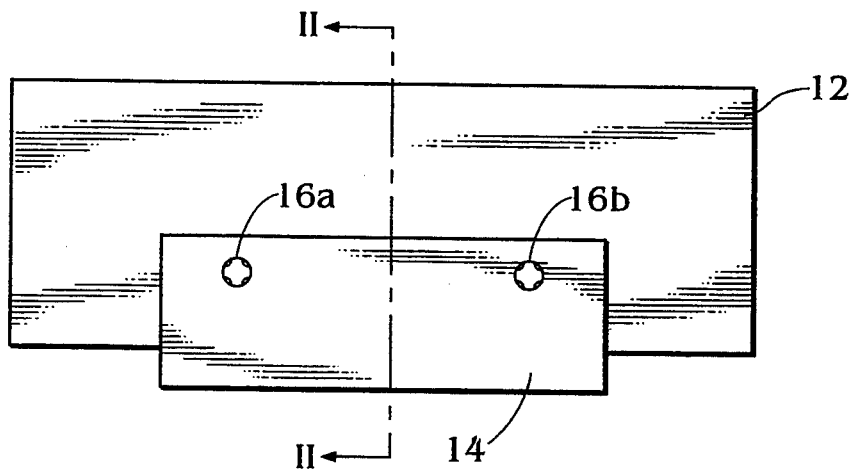
FIG. 1 is a front side elevational view of a prior art wear shoe assembly.
Figure 2:
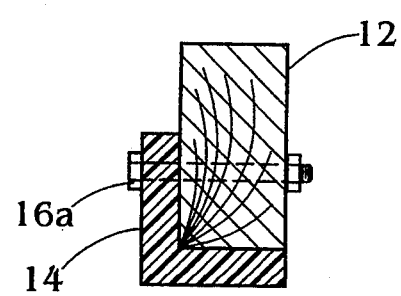
FIG. 2 is a cross Sectional view of the prior art wear shoe assembly taken along the line II—II, of FIG. 1.
Figure 3:
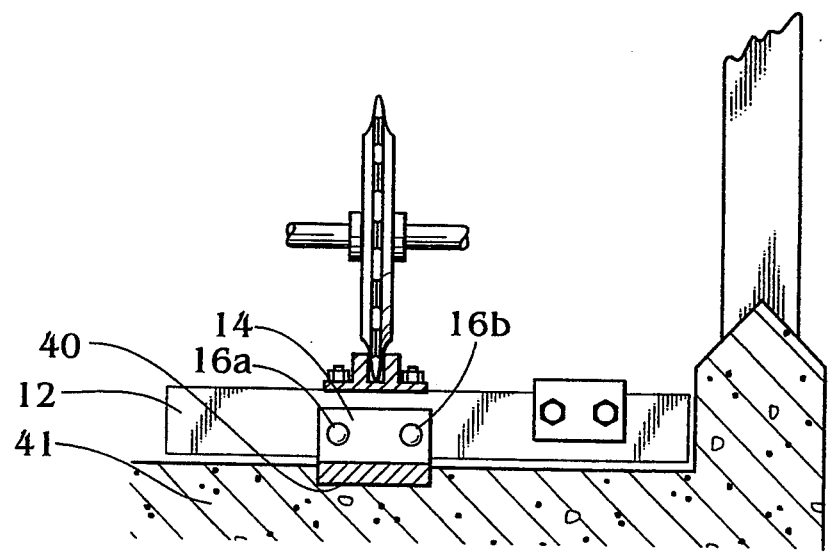
FIG. 3 is a front side elevational view of the prior art wear shoe assembly within a water treatment tank shown in cross section.

Turning now in detail to the drawings and in particular FIGS. 1 and 2, there is shown the prior art embodiment of a wear shoe 14 fastened to a sludge collector flight 12. Bolts 16a and 16b are used to fasten wear shoe 14 to flight 12. Thus, in order to replace shoe 14, bolts 16a and 16b are removed and a new shoe is fastened to flight 12 by replacing bolts 16a and 16b. FIG. 3 shows the prior art embodiment as is used in operation in a sludge collecting tank shoe 14 rides along a rail 40 embedded in a concrete base 41 of the tank.

The wear shoes are generally made of a plastic material and are fastened to the flight using screws or nuts and bolts (fastening hardware). The average life of a wear shoe is between 12 and 18 months depending on the frequency of use. However, the wear shoe and fastening hardware remain submerged in the waste water tank even if the flights are idle. Although the fastening hardware is generally made from stainless steel, after extended exposure to the waste water, the screws or nuts and bolts rust and corrode and become extremely difficult to remove. In extreme cases, the fastening hardware must be cut in order to remove the shoes. This is labor intensive and results in unacceptable down time of the equipment, especially if many shoes need to be replaced. Additional cost is incurred in that new fastening hardware is required each time a shoe is replaced.

It becomes obvious that this method of replacing a wear shoe is tedious and very time consuming when numerous shoes must be replaced.

Figure 4:
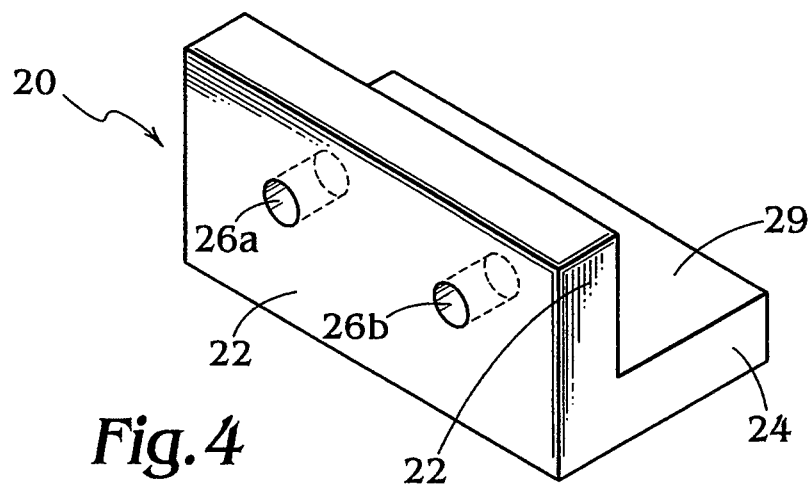
FIG. 4 is a perspective view of the wear shoe of the prior art used in the present invention.

FIG. 4 shows the wear shoe 20, according to the prior art, used in the present invention. Wear shoe 20 has an upper member 22 and a lower member 24. Upper member 22 and lower member 24 are in perpendicular relation to one another such that wear shoe 20 is L-shaped in cross-section. Wear shoe 20 is provided with apertures 26a and 26b therethrough. Apertures 26a and 26b are disposed in upper member 22 of wear shoe 20. Wear shoe 20 has an outer surface 28 and an inner surface 29. Although only two apertures are shown, it will become apparent from the following description that any number of apertures may be employed for use with the invention.

Figure 5:
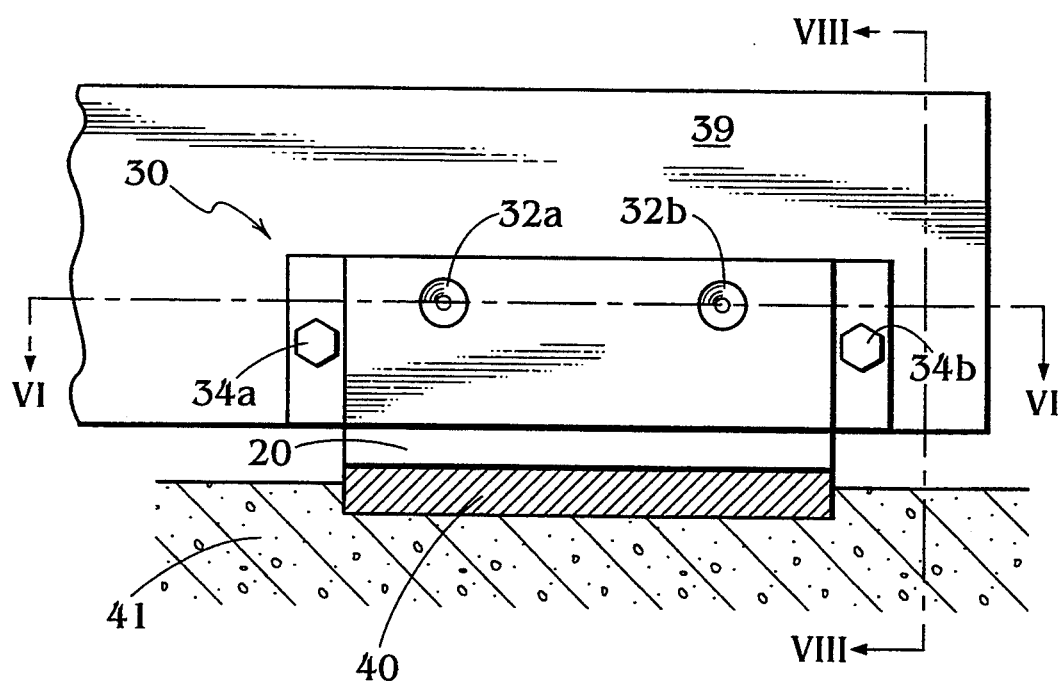
FIG. 5 is a front side elevational view of an embodiment of a retaining plate of the invention with a wear shoe in place.
Figure 6:
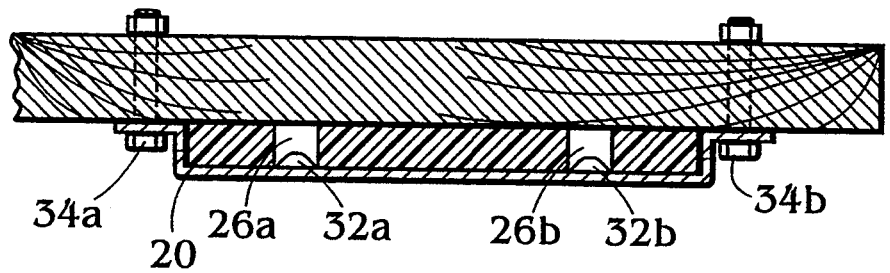
FIG. 6 is cross sectional view of the retaining plate taken along the line VI—VI, of FIG. 5.
Figure 7:
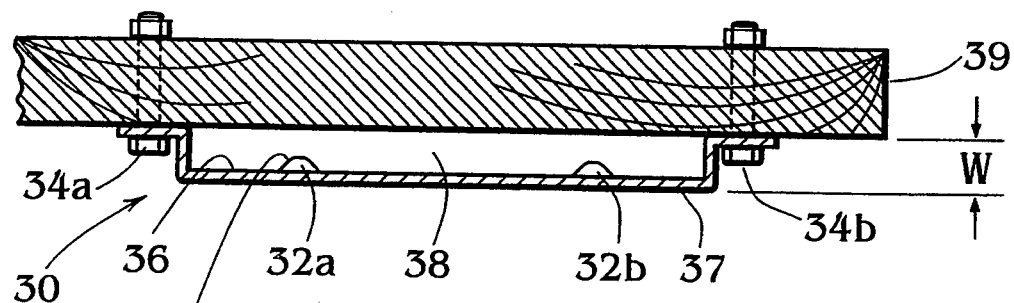
FIG. 7 is cross sectional view of the retaining plate similar to FIG. 6, with the wear shoe removed.

FIG. 5 shows an embodiment of a the retaining plate 30 according to the present invention. Retaining plate 30 is fastened to sludge collector flight 39 by bolt fasteners 34a and 34b. Although bolt fasteners 34 are subject to rust and corrosion like the prior art fastening devices, fasteners 34 need not be removed to replace the wear shoe. Detents 32a and 32b project inwardly from an inner surface 36 of retaining plate 30 toward flight 39, as can be seen in FIG. 7. Retaining plate 30 forms an opening 38 between the inner surface 36 of retaining plate 30 and flight 39. Opening 38 has a width W approximately equal to the width of upper member 22 of wear shoe 20 such that wear shoe 20 fits snugly within opening 38. Retaining plate 30 completely surrounds upper member 22 of wear shoe 20 when the latter is in operating position. Thus, retaining plate 30 provides lateral support across the entire outer surface 28 of wear shoe 20. Whereas the prior art fastening method only provides support to the wear shoe at the fastening points of the bolts. Wear shoe 20 is shown retained by retaining plate 30 according to the present invention. Rail 40, embedded in cement base 41 has a width equal to the width of wear shoe 20. Wear shoe 20 and rail 40 can wiry in size, but both should have the same width to provide for proper operation of the sludge collector flight.

Figure 8:
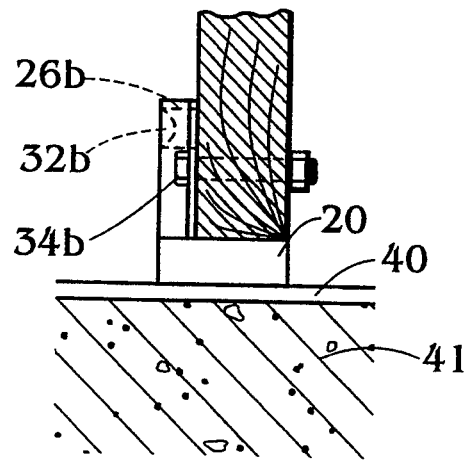
FIG. 8 is a cross sectional view of the assembly taken along the line VIII—VIII, of FIG. 5.

Upon inserting wear shoe 20 into opening 38, created by retaining plate 30, detents 32a and 32b are forced into contact with outer surface 28 of wear shoe 20. This contact causes retaining plate 30 to flex outwardly in order to allow wear shoe 20 to be inserted and removed from retaining plate 30. As wear shoe 20 is pushed into position, detents 32a and 32b become axially aligned with apertures 26a and 26b, respectively, and retaining plate 30 retracts or snaps back into its unflexed position. Upon axial alignment, detents 32a and 32b engage apertures 26a and 26b, respectively, and retain wear shoe 20 in its proper operating position (FIGS. 5 and 8).

Detents 32a and 32b have a sloped configuration 31 to facilitate the insertion and removal of wear shoe 20 (FIG. 7). That is, sloped configuration 31 of detents 32a and 32b causes retaining plate 30 to flex outwardly upon insertion and removal of wear shoe 20 into and from retaining bar 30, respectively. For example, detents 32a and 32b could be frustoconical or hemispherical in shape. Since the detents fit into the apertures on the standard wear shoes, the retaining plate 30 according to the invention can be retrofitted onto existing sludge collector flights to be used with any existing stock of wear shoes.

While only a single embodiment of the present invention has been shown and described, it is to be understood that many changes and modifications may be made thereunto without departing from the spirit and scope of the invention as defined in the appended claims.

What is claimed is:

1. A wear shoe retainer assembly for a sludge collector flight having a wear shoe, the wear shoe having an inner surface, an outer surface, an upper member and a lower member, said upper member being in perpendicular relation to the lower member, said upper member having at least one aperture therethrough, the assembly comprising:

a retaining plate fastened to the sludge collector flight for flexibly and releasably holding said wear shoe adjacent the sludge collector flight, said retaining plate having an inside surface, an outside surface, and at least one detent is formed on said inside surface for seating in said at least one aperture of the wear shoe.

2. The assembly according to claim 1, wherein said inside surface of said retaining plate is spaced from the sludge collector flight to form an opening for receiving the wear shoe and securing it to the sludge collector flight.

3. The assembly according to claim 2, wherein the wear shoe is movable between an attached position where said at least one detent is axially aligned with said at least one aperture in the wear shoe and an unattached position.

4. The assembly according to claim 3, wherein said inside surface of said retaining plate abuts the outer surface of the wear shoe in the attached position.

5. The assembly according to claim 4, wherein the wear shoe is made of a plastic material.

6. The assembly according to claim 5, wherein said retaining plate is made of stainless steel.

7. The assembly according to claim 6, wherein said at least one detent is sloped toward the sludge collector flight for facilitating the insertion and removal of said wear shoe from said retainer.

8. A device for removably coupling a wear shoe to a sludge collector flight comprising:
   a retaining plate having two flanges securely attached to the sludge collector flight, said retaining plate having a central section and a space between said central section and the sludge collector flight, said space receiving and retaining the wear shoe in an operative position.

9. The device according to claim 8, wherein said central section of said retaining plate is U-shaped and has two legs each with a free end.

10. The device according to claim 9, wherein said free ends are disposed adjacent the sludge collector flight and each of said free ends is integrally connected to a corresponding one of said two flanges.

11. The device according to claim 10, wherein said U-shaped central section has a base portion connected between said two legs, said base portion including detents extending toward the sludge collector flight for engaging the wear shoe.

12. The device according to claim 11, wherein said detents are tapered in the direction of the sludge collector flight.

13. A device for releasably coupling a wear shoe to a sludge collector flight, comprising:
   a sludge collector flight having a leading surface facing a direction of travel;
   a U-shaped retaining plate including
   (i) a base disposed substantially parallel to said sludge collector flight and spaced from said sludge collector flight to form a wear shoe receiving slot;
   (ii) two legs extending between said base and said sludge collector flight defining spaced opposite ends of the slot, each of said legs having a free end; and
   (iii) means for engaging the wear shoe and resiliently retaining the wear shoe adjacent said leading surface of said sludge collector flight;
   a flange integrally formed with each of said free ends, the flanges being fastened to said leading surface of said sludge collector flight; and
   wherein said retaining plate is adapted for flexing outwardly away from said sludge collector flight to facilitate releasable coupling of the wear shoe with the wear shoe receiving slot and said engaging means.

14. A wear shoe retainer assembly for a sludge collector flight having an L-shaped wear shoe, the wear shoe having an upper member with apertures therethrough and a base member for riding on a rail, the assembly comprising:
   retaining means fastened to the sludge collecting flight for flexibly and releasably holding said wear shoe adjacent the sludge collector flight said retaining means having an inside surface; and
   securing means formed on said inside surface of said retaining means for engaging the apertures of the wear shoe.

15. A wear shoe retainer assembly for a sludge collector flight having an L-shaped wear shoe, the wear shoe having an upper member with apertures therethrough and a base member for riding on a rail, the upper member having an outer surface, the assembly comprising:
   retaining means fastened to the sludge collecting flight for flexibly and releasably holding said wear shoe adjacent the sludge collector flight, whereby said retaining means provides lateral support across the entire outer surface of the wear shoe.

16. A wear shoe retainer assembly for a sludge collector flight having an L-shaped wear shoe, the wear shoe having an upper member and a base member for riding on a rail, the assembly comprising:
   retaining means fastened to the sludge collecting flight for flexibly and releasably holding said wear shoe adjacent the sludge collector flight, whereby said retaining means remains fastened to the sludge collecting flight when the wear shoe is removed.

* * * * *